F. H. PAYNE.
GAS METER.
APPLICATION FILED JULY 9, 1915.
1,206,365.
Patented Nov. 28, 1916.
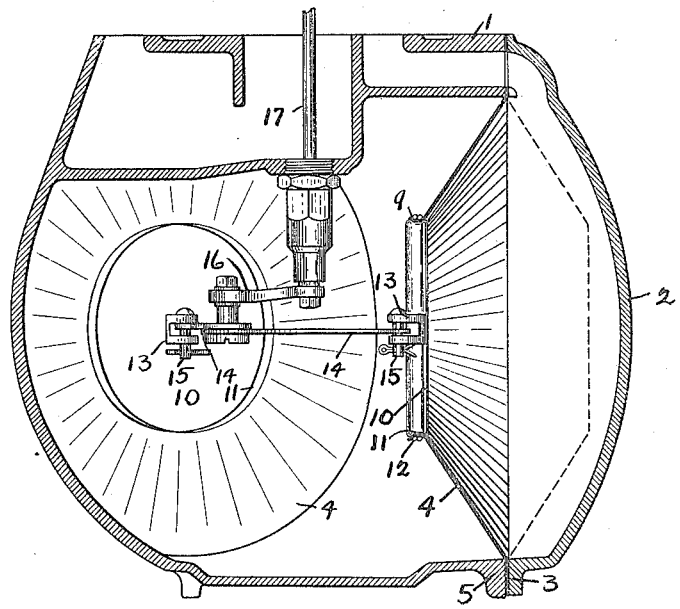
Fig. 1.
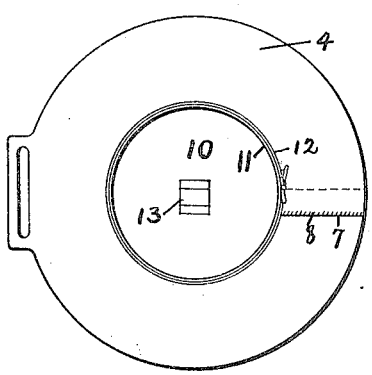
Fig. 2.
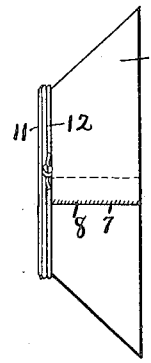
Fig. 3.
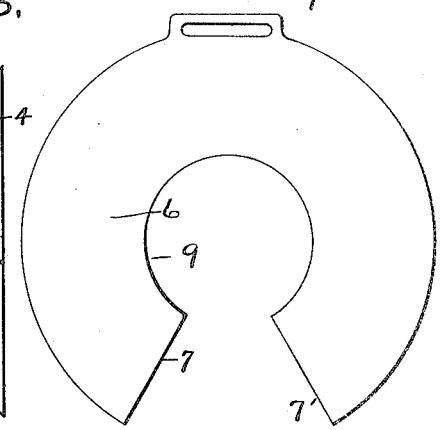
Fig. 4.
Fig. 5.
Witnesses
B. M. Hartman
Justin P. Slocum
Inventor
Frank H. Payne
By W. R. Lord
Attorney

UNITED STATES PATENT OFFICE.

FRANK H. PAYNE, OF ERIE, PENNSYLVANIA.

GAS-METER.

1,206,365.    Specification of Letters Patent.    Patented Nov. 28, 1916.

Application filed July 9, 1915. Serial No. 38,877.

*To all whom it may concern:*

Be it known that I, FRANK H. PAYNE, a citizen of the United States, residing at Erie, in the county of Erie and State of Pennsylvania, have invented new and useful Improvements in Gas-Meters, of which the following is a specification.

This invention relates to gas meters and consists in certain improvements in the construction thereof as will be hereinafter fully described and pointed out in the claims.

In the making of gas meters it is customary to use a leather diaphragm moving into and out of the measuring chamber as the gas passes through the meter. In some forms of meters these diaphragms are of conoidal or bulging shape being seated around their edges on a diaphragm base. As exemplified in the structure here shown this base is arranged on the periphery of a recess formed in the meter shell. Heretofore these diaphragms have been formed by stretching and forming a disk of leather so as to give it conoidal form. This makes a diaphragm free from joints but leather so formed tends to return to its original shape and where the conoidal shape has been given to a disk by stretching and forming the tendency is to flatten out, this being the original shape. The result of this tendency in a gas meter is to interfere with the correct measurement of the gas because the diaphragm thus flattened does not have the required bulge to give to the chamber formed by the diaphragm the right capacity.

The object of the present invention is to obviate this difficulty.

The invention is illustrated in the accompanying drawings as follows:—

Figure 1 shows a central vertical section of a gas meter case with the diaphragms in place. Fig. 2 a front elevation of the diaphragm. Fig. 3 a side elevation. Fig. 4 a leather piece, sector-shaped, from which the diaphragm is formed. Fig. 5 a side elevation of the sector piece shown in Fig. 4.

1 marks the body of the meter case. It is provided with the removable chamber plates 2 on the inner face of each of which is a cavity. The plate is surrounded by a seat 3. The diaphragm 4 is secured on the seat 3 being clamped between the seat 3 and the face 5 of the body of the meter case, the face 5 forming a diaphragm base.

The diaphragm in its completed shape is of conoidal or bulging form. It is formed of leather and of a sector-shaped piece 6, the edges 7 being secured together preferably by stitching as at 8, the stitching only extending through the surface of the leather so as to prevent a perforation extending entirely through the leather. The bringing of the edges 7 together in itself shapes the diaphragm without in any way stretching the leather so that the leather so formed has a natural tendency to retain this shape and for this reason a meter provided with this diaphragm will retain its accuracy.

The diaphragm has an opening 9 at the center in which is arranged a link plate 10. The link plate has an annular flange 11 around which the edge of the diaphragm surrounding the opening 9 is secured. This is preferably secured by several wraps of a cord 12, the annular flange being grooved to better retain the diaphragm in place.

The link plate has a fork 13 secured to it and the link 14 is secured to the fork by means of a pin 15. The link extends to the crank 16. The crank 16 is mounted on the rod 17. The rod 17 is connected to the valve and registering mechanism (not shown) of the meter in the usual manner.

What I claim as new is:—

1. In a dry gas meter, means forming a measuring chamber comprising a diaphragm base; and a diaphragm having its edge seated on said base, said diaphragm being of leather and of conoidal shape formed by joining the edges of a sector-shaped piece.

2. In a dry gas meter, means forming a measuring chamber comprising a diaphragm base; a diaphragm having its edge seated on said base, said diaphragm being of leather and of conoidal shape formed by joining the edges of a sector-shaped piece and having an opening at its center; a link plate in the opening, said plate having an annular flange; and means for binding the edge of the diaphragm surrounding the opening on the flange.

3. In a dry gas meter, means forming a measuring chamber comprising a diaphragm base; a diaphragm having its edge seated on said base, said diaphragm being of leather and of conoidal shape formed by joining the edges of a sector-shaped piece and having an opening at its center; a link plate in the opening, said plate having an annular grooved flange: and means for binding the edge of the diaphragm surrounding the opening on the flange.

4. In a dry gas meter, means forming a measuring chamber comprising a diaphragm base; a diaphragm having its edge seated on said base, said diaphragm being of leather and of conoidal shape formed by joining the edges of a sector-shaped piece and having an opening at its center; a link plate in the opening, said plate having an annular flange; and a cord wrapped on the edge of the diaphragm surrounding the opening binding the edge of the diaphragm on the annular flange.

5. In a gas meter, the combination of a diaphragm base; a diaphragm having its edge seated on said base, said diaphragm being of leather and of conoidal shape formed by joining the edges of a sector-shaped piece, the joint being formed by overlapping the edges of the sector-shaped piece and sewing said edges together, the stitches penetrating only partly through the wall of the leather forming the inner lap at the joint.

In testimony whereof I have hereunto set my hand in the presence of two subscribing witnesses.

FRANK H. PAYNE.

Witnesses:
 THOMAS C. MILLER,
 B. M. HARTMAN.

Copies of this patent may be obtained for five cents each, by addressing the "Commissioner of Patents, Washington, D. C."